US006775613B2

(12) United States Patent
Burt et al.

(10) Patent No.: US 6,775,613 B2
(45) Date of Patent: Aug. 10, 2004

(54) METHOD AND SYSTEM FOR VEHICLE PROXIMITY SEARCHING

(75) Inventors: Wylie R. Burt, Ypsilanit, MI (US); Kelley Kettenbeil, Royal Oak, MI (US); Mark Gibb, Waterford, MI (US); Daniel A. Hanevich, Camirallo, CA (US)

(73) Assignee: General Motors Corporation, Detroit, MI (US)

( * ) Notice: Subject to any disclaimer, the term of this patent is extended or adjusted under 35 U.S.C. 154(b) by 24 days.

(21) Appl. No.: 10/100,320

(22) Filed: Mar. 25, 2002

(65) Prior Publication Data

US 2003/0182057 A1 Sep. 25, 2003

(51) Int. Cl.[7] ............................................. G01C 21/26
(52) U.S. Cl. .................. 701/213; 701/206; 340/995.24
(58) Field of Search ........................... 701/201, 202, 701/206, 208, 209, 210, 211, 213; 340/995.24, 995.23, 995.12, 995.17

(56) References Cited

U.S. PATENT DOCUMENTS

| | | | | |
|---|---|---|---|---|
| 5,648,768 A | * | 7/1997 | Bouve | 340/988 |
| 6,064,941 A | * | 5/2000 | Nimura et al. | 701/210 |
| 6,178,377 B1 | * | 1/2001 | Ishihara et al. | 701/200 |
| 6,421,602 B1 | * | 7/2002 | Bullock et al. | 701/201 |
| 6,427,117 B1 | * | 7/2002 | Ito et al. | 701/209 |
| 6,484,093 B1 | * | 11/2002 | Ito et al. | 701/211 |
| 6,542,814 B2 | * | 4/2003 | Polidi et al. | 701/208 |
| 6,546,335 B1 | * | 4/2003 | Tompkins et al. | 701/209 |
| 6,552,682 B1 | * | 4/2003 | Fan | 342/357.09 |
| 6,553,310 B1 | * | 4/2003 | Lopke | 701/213 |
| 6,662,105 B1 | * | 12/2003 | Tada et al. | 701/209 |
| 2002/0010543 A1 | * | 1/2002 | Watanabe et al. | 701/211 |

OTHER PUBLICATIONS

Cadillac Media Information for Release: Feb. 9, 1996, 1 pm, article entitled, "A New Star for Cadillac Customers", Cadillac Motor Car Division—Communications, pp. 1–5.
GM North American Operations for Release: Friday, Feb. 9, 1996, article entitled: "General Motors Announces Onstar", Contact: Dean Rotondo and Julie Hamp, pp. 1–5.
Onstar Innovative Services in Motion, Cadillac Journey of Innovation—Coming in 1997, article entitled, "What's Coming in 1997", pp. 1–6.

* cited by examiner

*Primary Examiner*—Tan Q. Nguyen
(74) *Attorney, Agent, or Firm*—Anthony Luke Simon

(57) ABSTRACT

The invention provides a method of searching for features of interest in proximity to a mobile vehicle. A vehicle location coordinate and a vehicle proximity parameter are provided to a vehicle proximity search application. The application generates a vehicle proximity area for the mobile vehicle based on the mobile vehicle location coordinate and the vehicle proximity parameter. The application may access a database containing features of interest. A feature or element of interest that has any portion of it in the vehicle proximity area is selected. The distance from each feature of interest to the mobile vehicle location is calculated.

22 Claims, 5 Drawing Sheets

METHOD AND SYSTEM FOR VEHICLE PROXIMITY SEARCHING

FIELD OF THE INVENTION

This invention relates generally to the searching for features of interest to a mobile vehicle. In particular, this invention relates to a geophysical method for determining the proximity of features of interest to the mobile vehicle, and a geospacial method for achieving the same.

BACKGROUND OF THE INVENTION

Historically, a variety of approaches have been used to locate possible points of interest to the operator of a mobile vehicle. These approaches include pre-planning of trips with word-of-mouth or hand-written directions; verbal recommendations and instructions from on-board passengers with local knowledge of businesses and residences; consultation of on-board maps and guidebooks; visual searching using road-side signs, billboards and storefronts; and exploration of nearby candidates by the vehicle operator. As our society and culture becomes increasingly mobile and our rural and urban roadways become increasingly complex, the need for rapid and accurate methods to find and locate suitable points of interest in close proximity to the current geophysical location of our vehicle increases.

Well-indexed maps along with a physical address of the current vehicle location and addresses for possible sites of interest have predominated the normal search method for a majority of drivers. There are, however, many cases where the location of interest is not presently known to the driver, and assistance is beneficial. Such cases include when the vehicle is en-route to a given destination, and unforeseen needs arise for example, for a restaurant, bathroom, automobile care facility or emergency accommodations. Other cases arise while traveling, particularly with the increase usage of cell phones for person-to-person mobile communication, to locate possible points of interest in response to commercial or retail requests.

Autonomous systems have been developed and are commercially available to assist the driver in determining local places of interest. These systems typically use GPS (Global Positioning System) units to identify the current location, heading and speed of the vehicle, along with an application that accesses a local database to determine possible sites of interest and driving directions to get there. An on-board display then conveys the information graphically to the driver.

These systems may provide useful information to the vehicle operator, yet are limited in the amount and type of information they can convey. These systems cannot provide the latest information regarding building or residential addresses, and other current data such as traffic conditions, road conditions, local weather, vehicle accidents or road detour information. Furthermore, these systems may not provide hands-free operation for safety while driving, nor provide accurate, verbal interactions with a real or virtual advisor for exploring possibilities and determining an appropriate destination and route information.

SUMMARY OF THE INVENTION

One aspect of the invention provides a method of searching for an element of interest in proximity to a mobile vehicle. A mobile vehicle location coordinate is provided, along with a vehicle proximity parameter. A vehicle proximity area is determined, based on the mobile vehicle location coordinate and the vehicle proximity parameter. Features or elements of interest within the vehicle proximity area are determined. The distance from the feature or element of interest is determined.

The vehicle location coordinate may be generated by an on-board Global Positioning System (GPS). The vehicle proximity parameter may be a default or user-defined distance, and the vehicle proximity area may be a box centered upon or enclosing the vehicle location coordinate. Features or elements of interest may be selected from a plurality of elements of interest that are contained in a database. The element of interest may be represented as a point, line, polygon or region. The element of interest is within the vehicle proximity area if at least one point of the element of interest is within the vehicle proximity area. Elements of interest may be further classified based on distance to the vehicle. The vehicle proximity area also may be based on existing conditions, such as vehicle speed, direction, destination, destination route or destination route conditions.

Another aspect of the present invention provides a system for vehicle proximity searching. The system may include means for receiving a mobile vehicle location coordinate, means for receiving a vehicle proximity parameter, means for accessing at least one element of interest, means for determining if the element of interest is within the vehicle proximity area for the mobile vehicle, and means for determining the distance from the mobile vehicle to the element of interest.

The vehicle proximity searching system may include a GPS system for determining the mobile vehicle location coordinate. Information between the mobile vehicle and other parts of the system may be transmitted using a communication system, of which one part may be a wireless system.

Another aspect of the present invention provides a computer usable medium including a program for searching for elements of interest.

The program may include computer program code that searches one or more databases for elements of interest in proximity to a mobile vehicle. The program may also include computer program code that receives a single mobile vehicle location coordinate or a continuous feed of vehicle locations. The program may also include computer program code that receives a vehicle proximity parameter, and determines a corresponding vehicle proximity area. The mobile vehicle location coordinate and the vehicle proximity parameter may be received using a wireless communication system. The program may also include computer program code that determines if an element of interest is located within the vehicle proximity area, and calculates the distance between the mobile vehicle location coordinate and the element of interest.

The program may also include computer program code that further classifies each element of interest based on the distance from each element of interest to the mobile vehicle, or based on existing conditions. Existing conditions may include, for example, vehicle speed, destination, destination route and route conditions.

The foregoing, and other, features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENTS

Figure 1:
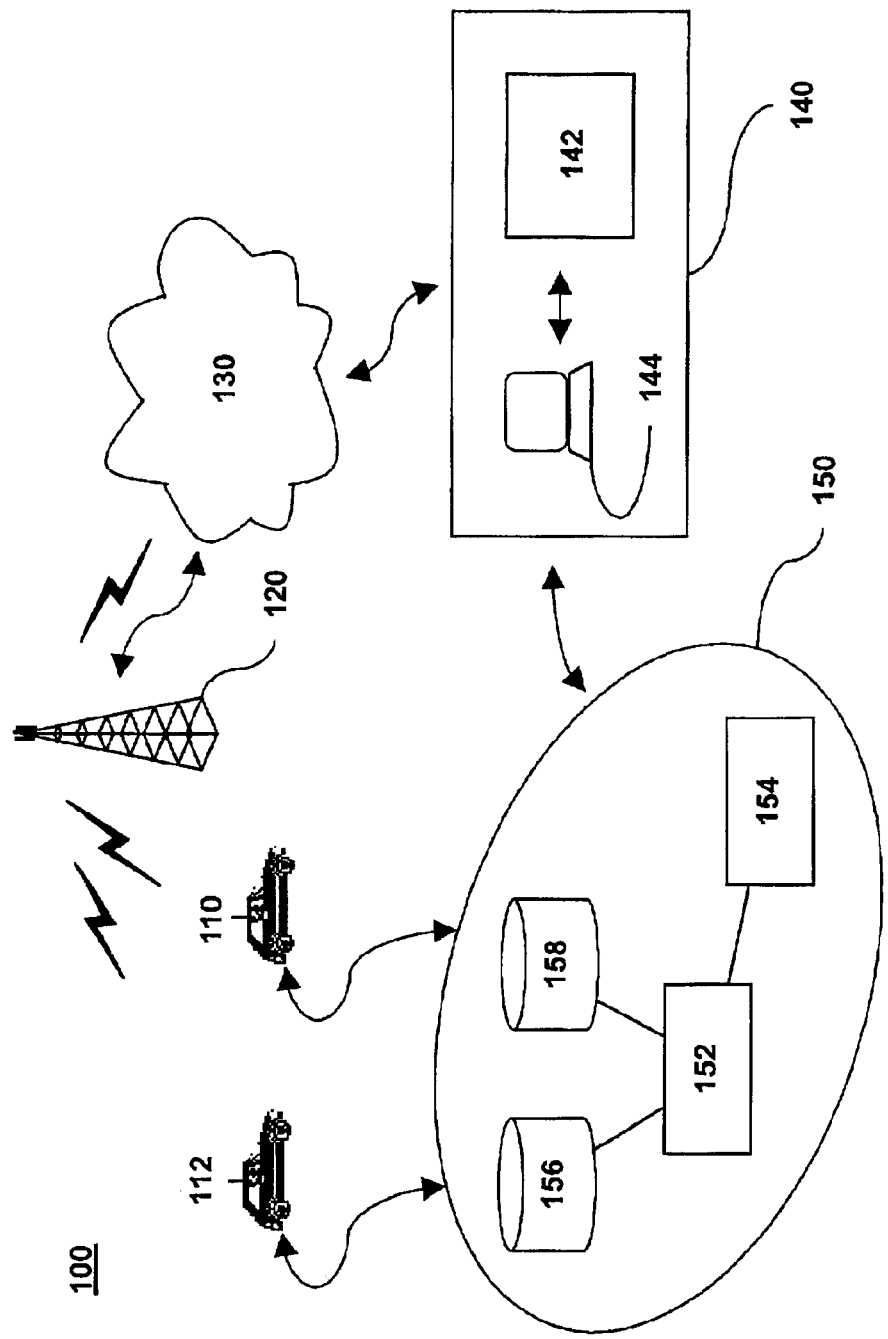
FIG. 1 is a schematic diagram of one embodiment of a system for vehicle proximity searching in accordance with the current invention.

FIG. 1 shows one embodiment of a system for vehicle proximity searching to aid operators of mobile vehicles in accordance with the current invention at 100. The system 100 may include one or more vehicle clients 110, 112; one or more carrier systems 120; one or more communication networks 130; one or more service management subsystems 140; and one or more vehicle proximity search subsystems 150. The service management subsystems 140 may comprise one or more service management applications 142 and one or more service managers 144. The vehicle proximity search subsystem 150 may comprise one or more vehicle proximity search applications 152, 154 and one or more coordinate databases 156, 158.

Vehicle proximity search subsystem 150 may be a system for generating suitable features of interest to be delivered to vehicle clients 110, 112 and for receiving vehicle coordinate location information from vehicle client 110, 112. Vehicle proximity search subsystem 150 may be connected to or in communication with service management subsystem 140. Service management subsystem 140 may be used to manage the delivery of information to or from vehicle proximity search subsystem 150 or to other parts of system 100. Features of interest may be delivered or information may be received via a live agent, such as a human advisor, or via a virtual agent, such as an interactive computer program.

Vehicle proximity search subsystem 150 may be any suitable hardware or software configuration, or combination of hardware and software that is configured to generate vehicle proximity information, process vehicle proximity information or receive information from vehicle client 110, 112. In one embodiment of the invention, vehicle proximity search subsystem 150 comprises one or more vehicle proximity search applications 152, 154 and one or more coordinate databases 156, 158. For example, vehicle proximity search applications 152, 154 may be suitable software applications for generating vehicle proximity information or otherwise processing vehicle proximity information. Coordinate databases 156, 158 may be any suitable databases for storing feature of interest information, such as location coordinates.

Vehicle client 110, 112 may be any suitable vehicle. For example, the vehicle may be an automobile or truck, or a passenger-carrying unit such as a bus or train. Alternatively, vehicle client 110, 112 may be an occupant of the vehicle or any suitable client device contained in the vehicle. In one embodiment of the invention, vehicle client 110, 112 is a mobile or portable device equipped to communicate with service management subsystem 140.

Carrier system 120 is any suitable system for transmitting a signal from vehicle 110, 112 to service management subsystem 140. Carrier system 120 may also transmit a signal from service management subsystem 140 to vehicle client 110, 112. In one embodiment of the invention, carrier system 120 is a wireless carrier system as is well known in the art. Carrier system 120 may be, for example, a transmitter/receiver unit attached to vehicle client 110, 112. Alternatively, carrier system 120 may be a separate transmitter/receiver carried by vehicle client 110, 112.

Communication network 130 is any suitable system for communicating between vehicle client 110, 112 and service management subsystem 140. In one embodiment of the invention, the communication network is a public switched telephone network (PSTN). Alternatively, communication network 130 may be a multi-protocol Internet or intranet capable or transmitting voice and/or data in either analog or digital form, or a combination of both. Alternatively, communication network 130 may be a hybrid communication network or virtual network.

Service management subsystem 140 may be a system for managing one or more services to be delivered to or from vehicle client 110, 112. In one embodiment of the invention, service management subsystem 140 manages services that are distributable over a variety of channels. For example, services may be delivered via a live agent, such as a human advisor, or via a virtual agent, such as an interactive computer program. The structure of service management subsystem 140 may enable services to be delivered in a uniform manner regardless of the channel used for delivery or of the service being delivered. Service management subsystem 140 may maintain a consistent subscriber experience and "look and feel" across the products being delivered across the service distribution channels enabled.

Service management subsystem 140 may be any suitable hardware or software configuration, or combination of hardware and software that is configured to standardize each service being delivered via the subsystem 140, and to standardize each channel of delivery. In one embodiment of the invention, service management subsystem 140 standardizes each service and channel using personalization information from vehicle client 110, 112. Thus, service management subsystem 140 may have a common profile mechanism across the services being delivered independent of the service distribution channel (live agent, virtual agent, web channel, speech channel) and of the service (news, weather, sports, stocks, etc.). In one embodiment of the invention, service management subsystem comprises one or more application components 142 and one or more service managers 144. For example, application 142 may be any suitable software application for managing one or more services. Service manages 144 may be any suitable hardware and/or software configuration or structure for executing applications 142.

Figure 2:
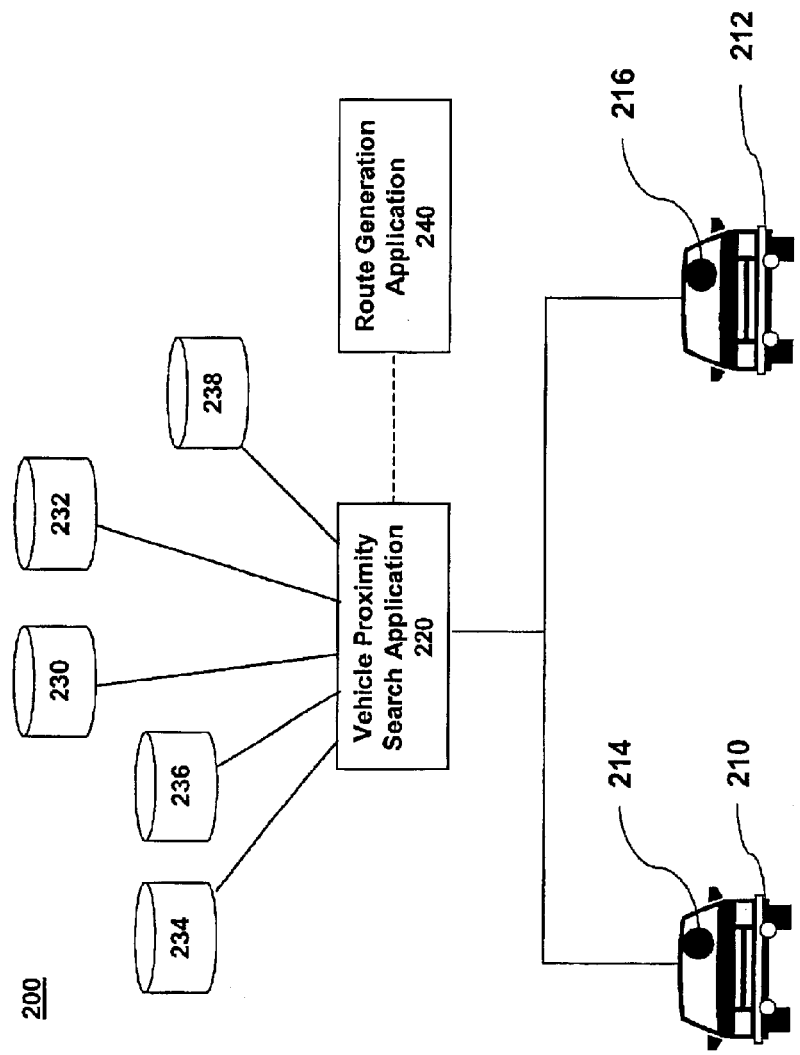
FIG. 2 is a schematic diagram of one embodiment of a vehicle proximity search subsystem in accordance with the current invention.

FIG. 2 shows one embodiment of a vehicle proximity search system in accordance with the present invention at 200. Vehicle proximity search system 200 may include one or more vehicle clients 210, 212. Each vehicle client 210, 212 may have an in-vehicle user 214, 216. Vehicle proximity search system 200 may also include one or more databases 230, 232, 234, 236, 238. Vehicle proximity search system 200 may also include one or more route generation applications 240.

In-vehicle user 214, 216 may be any suitable component of vehicle client 210, 212 that may be used to perform vehicle proximity searching. For example, in-vehicle user 214, 216 may be a driver. Alternatively, in-vehicle user 214, 216 may be an automatic system for performing vehicle proximity searching with vehicle client 210, 212.

Vehicle proximity search application 220 may generate vehicle proximity search information in any suitable manner. For example, vehicle proximity search application 220 may generate vehicle proximity search information using geographical information system (GIS) data based on coordinate data in coordinate database 230, 232. That is, vehicle proximity search application 220 may determine vehicle proximity search information using corresponding longitude and latitude coordinate data in coordinate database 230, 232 with vehicle coordinate data to generate vehicle proximity search information. Alternatively, vehicle proximity search application 220 may determine vehicle proximity search information using geophysical information contained in geophysical database 234. That is, vehicle proximity search application 220 may determine vehicle proximity search information using corresponding geophysical coordinate data contained in geophysical database 234. Alternatively, vehicle proximity search application 220 may determine vehicle proximity search information using geospatial data contained in geospatial database 236. Alternatively, vehicle proximity search application 220 may determine vehicle proximity search information using current conditions stored in a suitable current conditions database 238. Alternatively, one or more of databases 230, 232, 234, 236, 238 may be used in combination with vehicle proximity search application 220 to generate vehicle proximity search information.

Coordinate databases 230, 232 may be any suitable database containing coordinate information about features of interest. Coordinate databases 230, 232 may contain additional attributes about the features of interest. Additional attributes may include information such as address, city, zip code, type of business, specialties, website URLs and phone contacts.

Geophysical database 234 may be any suitable database containing geospatial information about features of interest. Geophysical database 234 may contain additional attributes about the features or regions of interest. Additional attributes may include information such as average temperature, rainfall, altitude, earthquake zones, flood planes, tornado occurrences, and geographical properties.

Geospatial database 236 may be any suitable database containing geospatial information about features of interest. Geospatial database 236 may contain additional attributes about the features of interest. Additional attributes may include information such as population density, political zone, crime rates, school district, average income of residents, and home prices.

Current conditions database 238 may be any suitable database containing current condition information about features of interest. Current conditions database 238 may contain additional attributes about the features of interest. Additional attributes may include information such as traffic conditions, road conditions, local weather, vehicle accidents or road detour information, or latest information regarding building or residential addresses.

Route generation application 240 may generate navigation information in any suitable manner. For example, route generation application 240 may generate routes using geocoding. That is, route generation application 240 determines a corresponding longitude and latitude based on an input navigation address. Alternatively, route generation application 240 may generate routes using reverse geocoding. That is, the route generation application 240 determines a corresponding navigation address based on input longitude and latitude coordinates. Route generation application 240 may generate navigation information in coordination with vehicle proximity search application 220.

Vehicle proximity search application 220 may reside inside vehicle client 210, 212 and operated by in-vehicle user 214, 216. One or more databases 230, 232, 234, 236, 238 may reside inside vehicle client 210, 212. Alternatively, one or more databases 230, 232, 234, 236, 238 may reside at a stationary site. Alternatively, vehicle proximity search application 220 may also reside at a stationary site. One or more databases 230, 232, 234, 236, 238 and/or vehicle search application 220 and/or route generation application 240 residing at a stationary site requires that communications with vehicle client 210, 212 have at least one wireless link. The wireless link may include, for example, data or voice transmission over a cellular phone.

Figure 3:
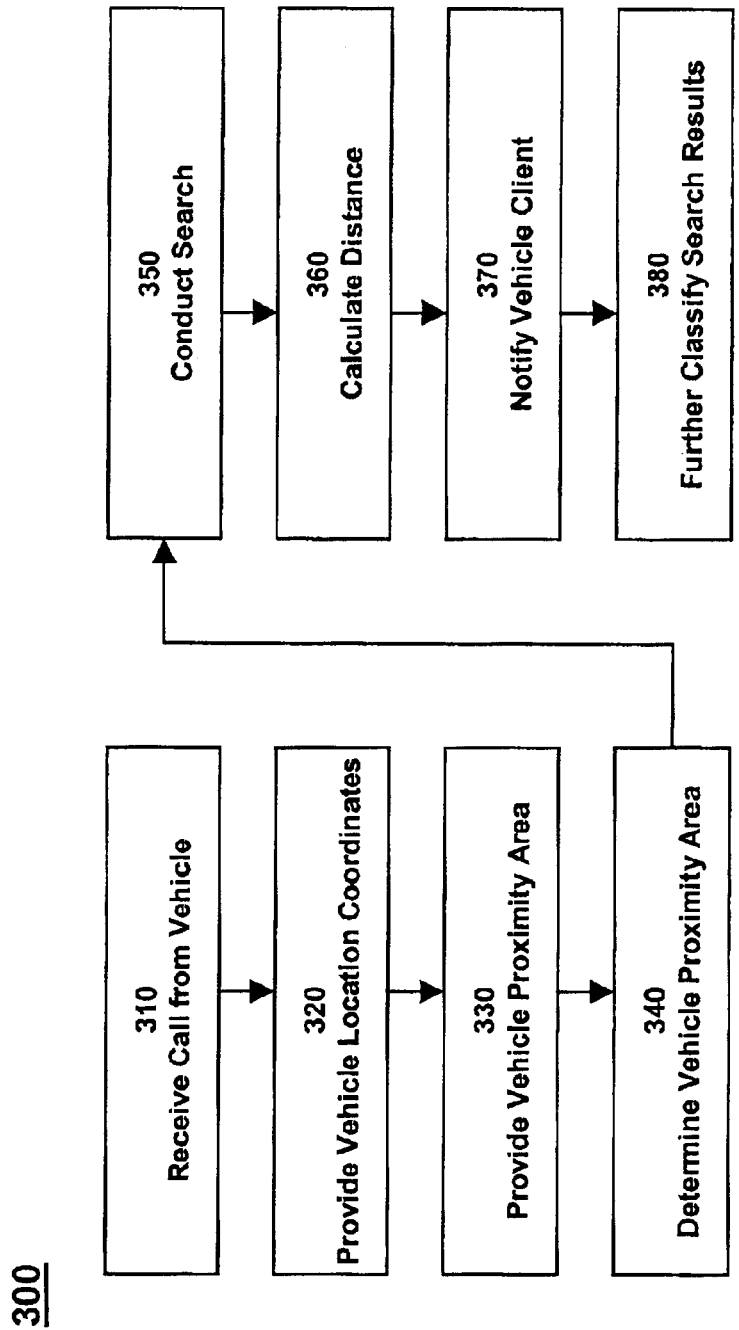
FIG. 3 is a flow diagram of one embodiment of a method for vehicle proximity searching in accordance with the current invention.

FIG. 3 shows a flow diagram of one embodiment of a method for vehicle proximity searching in accordance with the present invention at 300.

As can be seen at block 310, a call may be received from vehicle client 210, 212. For example, a call may be a request from a mobile vehicle to generate a vehicle proximity search. The call may be generated automatically by vehicle client 210, 212. Alternatively, the call may be generated directly by in-vehicle user 214, 216. The call may include one or more voice commands. Alternatively, the call may contain a series of data transmissions between vehicle client 210, 212 and service management subsystem 140.

As seen at block 320, the mobile vehicle location coordinates may be provided to the service management subsystem 140. Service management subsystem 140 may contain one or more vehicle proximity search applications 220. Service management subsystem 140 may directly communicate with location databases 156, 158. Vehicle proximity search application 220 may directly communicate with databases 230, 232, 234, 236.

As seen at block 330, a vehicle proximity parameter may be provided to service management subsystem 140. The vehicle proximity parameter, in its simplest form, is a single number representing the vehicle proximity range. The vehicle proximity range, for example, may be expressed in miles. The vehicle range parameter may be a default value. Alternatively, the vehicle range parameter may be a user-defined parameter.

As seen at block 340, a vehicle proximity area may be determined. For example, the vehicle proximity area is a region surrounding the vehicle location. The region may, for example, may be a circle centered on the vehicle location, with the radius of the circle being equal to the vehicle proximity parameter. Alternatively, the region may be a box centered on the vehicle location, with the distance from the center to each side of the box equal to the vehicle range parameter.

As seen at block 350, a search may be conducted for features or elements of interest. Features that are within the vehicle proximity area are included. Features of interest not in the vehicle proximity area are excluded.

As seen at block 360, distance may be calculated between the vehicle location coordinate and the feature of interest. Distance may be calculated using Euclidean geometry as the shortest distance between the vehicle location coordinate and the feature of interest. Alternatively, distance may be calculated using the shortest route information between the vehicle location and the feature of interest. Alternatively, distance may be calculated as the distance along the preferred route between the vehicle location and the feature of interest.

As seen at block 370, vehicle client 210, 212 may be notified. Notification of the vehicle client 210, 212 may occur, for example, using communication network 130 in conjunction with one or more wireless carrier systems 120. Notification to the in-vehicle user 214, 216 may be communicated using, for example, a graphical user interface (GUI) or voice user interface (VUI).

As seen at block 380, additional classification of the search results may be made. If no features of interest are selected, the vehicle range parameter may be enlarged and a new search made. If more than one feature of interest is identified, then the closest feature of interest to the vehicle location may be selected. Alternatively, if more than one feature of interest is identified, then vehicle client 210, 212 may be requested to provide additional attributes to narrow the selection. Alternatively, in-vehicle user 214, 216 may interact directly with service management subsystem 140 to provide additional attributes for narrowing the selection.

Figure 4:
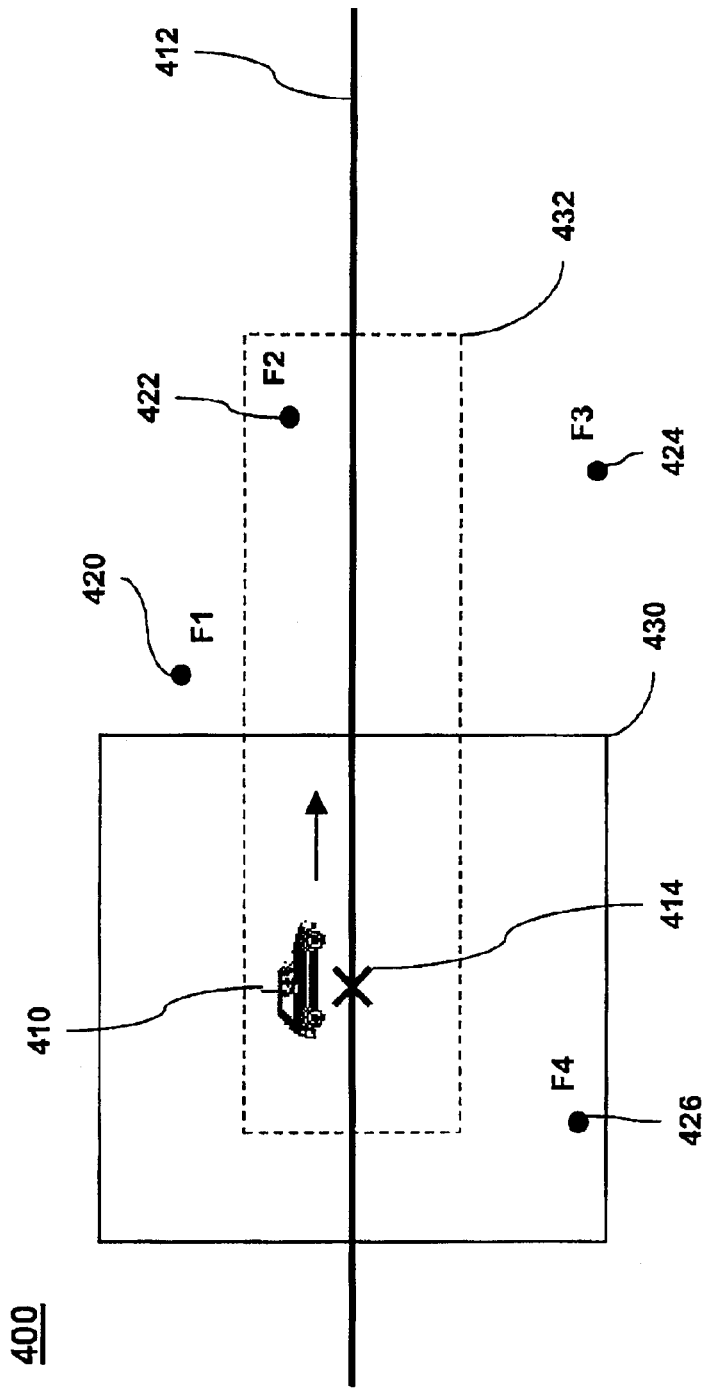
FIG. 4 is an illustration of one embodiment of a method for searching features of interest in proximity to a mobile vehicle in accordance with the current invention.

FIG. 4 shows a schematic illustration of one embodiment of a simple method for vehicle proximity searching for features of interest in accordance with the present invention at 400.

In the simple vehicle proximity searching method 400 shown, mobile vehicle 410 is traveling along intended route 412 while currently at location 414. The intended route 412 may be, for example, the route originally intended by in-vehicle user 214, 216 when departing from its origin to its destination. A mobile location coordinate 414 based on the current location of vehicle 410 may be provided to a service management subsystem 140. Vehicle location 414, for example, may be expressed as a longitude and latitude in accordance with accepted global standards used by geographical information systems (GIS). Vehicle location 414 may be provided, for example, by an on-board GPS system. Vehicle location 414 may also be, for example, a street address. A proximity parameter may also be provided to the service management subsystem 140. One or more features of interest may be requested from the mobile vehicle 410. A vehicle proximity area may be generated based on the mobile vehicle location coordinate 414 and the vehicle proximity parameter. The vehicle proximity parameter may be, for example, a distance, such as two miles. The vehicle proximity area 430 may be a box centered on the vehicle location coordinate 414, with each side of the box a distance equal to the vehicle proximity parameter away from the vehicle location coordinate. The default vehicle location parameter may be added to and subtracted from the vehicle location longitude to specify a constraint clause, for example, in a coordinate database. Similarly, the default vehicle location parameter may be added to and subtracted from the vehicle location latitude to specify a second constraint clause. The service management subsystem may then generate suitable features or elements of interest that may be in the vehicle proximity area. The distance from the mobile vehicle location to the element of interest may then be calculated.

Mobile vehicle 410, while traveling along its intended route 412, may request a search for possible sites of interest close to the vehicle's current location. Sites or features of interest may include any location, region or geographical landmark or structure. Features of interest may include, for example, museums, hotels, restaurants, gas stations, or the like. Features of interest 420, 422, 424, 426 may be locationally defined by a single point representing each feature of interest. For example, features of interest 420, 422, 424, 426 are represented by a longitude and latitude. Features of interest lying inside the vehicle proximity area 430 may then be identified by the search. The search, in this example, would reveal one feature of interest 426 located within the vehicle proximity area 430. The distance from the mobile vehicle location 414 to the feature of interest 426 may then be calculated. In cases where the search identifies no suitable locations, the vehicle proximity area 430 may be enlarged. In other cases where the search identifies more than one suitable feature of interest, the vehicle proximity area may be reduced, or further classification of the features of interest may be generated based on other attributes.

The default vehicle proximity area 430 may prove, in some instances, to be inadequate in locating a suitable feature of interest. The in-vehicle user 214, 216 may choose to enlarge or narrow the vehicle proximity parameter. Alternatively, the in-vehicle user may choose to narrow the vehicle proximity area along the intended route, and/or choose to select a vehicle location further down the intended route as illustrated with alternative vehicle proximity area 432.

Figure 5:
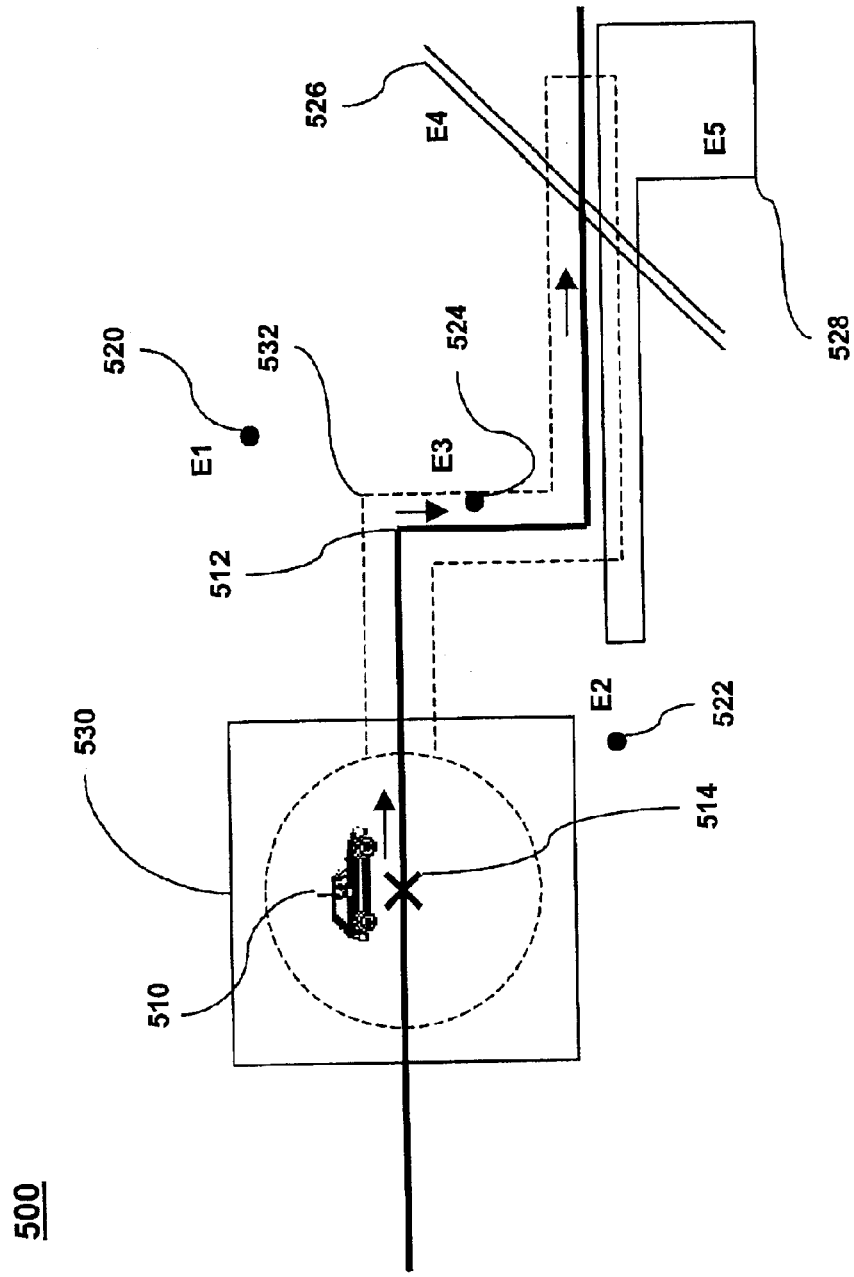
FIG. 5 is an illustration of another embodiment of a method for searching features of interest in proximity to a mobile vehicle in accordance with the current invention.

FIG. 5 shows a schematic illustration of another embodiment of a method for vehicle searching for features of interest referred to as the spacial method in accordance with the present invention at 500. Spacial vehicle proximity searching method 500 comprises mobile vehicle 510 traveling along intended route 512 while currently at vehicle location 514. The intended route 512 may be, for example, the route originally intended by in-vehicle user 214, 216 when departing from its origin to its destination. Vehicle location 514, for example, may be expressed as a longitude and latitude in accordance with accepted global GIS standards. Vehicle location 514 may also be, for example, a physical street address. A request may be made from mobile vehicle 510 to search features or elements of interest in proximity to the mobile vehicle, and to locate, for example, elements of interest within vehicle proximity area 530 closest to vehicle location 514.

Elements of interest 520, 522, 524 are represented as points, whereas other elements of interest may be represented by line 526 or polygon 528. Elements of interest 520, 522, 524 that are points may be represented by a longitude and latitude. Elements of interest that may be represented by points include, for example, homes, buildings or specific street addresses. Elements of interest that are lines may be represented by two or more points identifying the line, each point with a corresponding longitude and latitude. Elements of interest that may be represented by lines include, for example, railroad tracks, bicycle paths, rivers or international borders. Elements of interest that are areas or regions may be represented by polygons. Each vertex in the polygon may be represented by a corresponding longitude and latitude. Elements of interest that may be represented by polygons include, for example, parks, lakes, universities, squares, malls, airports, cities, counties, states or military installations.

The vehicle proximity area 530 may be defined, for example, by a box centered on the current vehicle location. The default vehicle location parameter may be added to and subtracted from the vehicle location longitude and latitude to determine the vehicle proximity area 530, and to specify constraint clauses, for example, in a coordinate database. Elements of interest represented by points that are lying within the vehicle proximity area 530 may be identified, and their distance to the mobile vehicle calculated. Elements of interest that are represented by lines may lie within the vehicle proximity area if any point along the line touches or is inside the vehicle proximity area. Elements of interest that are represented by polygons or regions may lie within the vehicle proximity area if any vertex or a point along any edge touches or lies within the vehicle proximity area.

In some instances, the default vehicle proximity parameter may prove to be inadequate in locating a satisfactory element of interest. The in-vehicle user 214, 216 may choose to enlarge or narrow the vehicle proximity parameter. Alternatively, the in-vehicle user may choose to narrow the vehicle proximity area within a specified radius of the current vehicle location or along the intended route as illustrated with alternative vehicle proximity area 532, and/ or choose to select a vehicle location further down the intended route. The vehicle proximity parameter may also be, for example, a set of coordinates relative to the vehicle location to define the vehicle proximity area 532. The vehicle proximity parameter may, for example, be determined in coordination with existing conditions such as vehicle speed, vehicle direction, vehicle destination, vehicle destination route and vehicle destination route conditions. For example, if a vehicle is traveling at a high rate of speed down an expressway, a preferred element of interest may be one that is close to the expressway on the intended route, and elements of interest may be classified accordingly. In another example, impending road detours or traffic accident sites may alter the vehicle proximity area used in the search, and generate elements of interest along the detour.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A method of searching for an element of interest in proximity to a mobile vehicle comprising:
   receiving a vehicle proximity search request from the mobile vehicle;
   receiving a mobile vehicle location coordinate from the mobile vehicle;
   receiving a vehicle proximity parameter from the mobile vehicle;
   determining a vehicle proximity area for the mobile vehicle based on the received mobile vehicle location coordinate and the received vehicle proximity parameter;
   determining whether the element of interest is located within the determined vehicle proximity area;
   determining a distance from the received mobile vehicle location coordinate to the element of interest; and
   transmitting a notification to the mobile vehicle based on the determined distance from the mobile vehicle location to the element of interest, wherein the vehicle proximity search request, the mobile vehicle location coordinate, and the vehicle proximity parameter are received at a stationary site.

2. The method of claim 1 wherein the element of interest is selected from a plurality of elements of interest contained in a database, the database residing at the stationary site.

3. The method of claim 1 wherein the element of interest is selected from a group consisting of a point, a line, a polygon and a region.

4. The method of claim 3 wherein the element of interest is within the vehicle proximity area when at least one point of the element of interest is within the vehicle proximity area.

5. The method of claim 1 wherein the vehicle proximity parameter is a distance.

6. The method of claim 1 wherein the vehicle proximity area comprises a box positioned around the mobile vehicle location coordinate.

7. The method of claim 6 wherein the distance from the mobile vehicle location coordinate to the sides of the box is substantially equal to the vehicle proximity parameter.

8. The method of claim 1 wherein the vehicle proximity area is determined based on an existing condition.

9. The method of claim 8 wherein the existing condition is selected from the group consisting of a vehicle speed, a vehicle direction, a vehicle destination, a vehicle destination route and a vehicle destination route condition.

10. The method of claim 1 further comprising:
    classifying each element of interest within the determined vehicle proximity area based on the determined distance from the received mobile vehicle location coordinate to the element of interest.

11. The method of claim 1 wherein receiving the mobile vehicle location coordinate comprises receiving a mobile vehicle location coordinate from an in-vehicle global positioning system unit.

12. A mobile vehicle proximity search system comprising:
    means for receiving a vehicle proximity search request from the mobile vehicle;
    means for receiving a mobile vehicle location coordinate from the mobile vehicle;
    means for receiving a vehicle proximity parameter from the mobile vehicle;
    means for determining a vehicle proximity area for the mobile vehicle based on the received mobile vehicle location coordinate and the received vehicle proximity parameter;
    means for determining whether the element of interest is located within the determined vehicle proximity area;
    means for determining a distance from the received mobile vehicle location coordinate to the element of interest; and
    means for transmitting a notification to the mobile vehicle based on the determined distance from the mobile vehicle location to the element of interest, wherein the vehicle proximity search request, the mobile vehicle location coordinate, and the vehicle proximity parameter are received at a stationary site.

13. The system of claim 12 further comprising:
    an in-vehicle global positioning system unit to provide the mobile vehicle location coordinate.

14. The system of claim 12 further comprising:
    a communication system connected between the mobile vehicle and the stationary site.

15. The system of claim 14 wherein the communication system has at least one wireless portion.

16. A computer usable medium including a program for searching a database for an element of interest in proximity to a mobile vehicle, comprising:
    computer program code to receive a vehicle proximity search request from the mobile vehicle;
    computer program code to receive a mobile vehicle location coordinate from the mobile vehicle;
    computer program code to receive a vehicle proximity parameter from the mobile vehicle;

computer program code to determine a vehicle proximity area based on the received mobile vehicle location coordinate and the received vehicle proximity parameter;

computer program code to determine whether an element of interest is located within the determined vehicle proximity area;

computer program code to determine a distance from the received mobile vehicle location coordinate to the element of interest; and computer program code to transmit a notification to the mobile vehicle based on the determined distance from the mobile vehicle location to the element of interest, wherein the vehicle proximity search request, the mobile vehicle location coordinate, and the vehicle proximity parameter are received at a stationary site.

17. The program of claim 16, further comprising:

computer program code to classify each element of interest within the determined vehicle proximity area based on the determined distance from the received mobile vehicle location coordinate to the element of interest.

18. The program of claim 16, further comprising:

computer program code to classify each element of interest based on an existing condition.

19. The program of claim 18, wherein the existing condition is selected from the group consisting of a vehicle speed, a vehicle direction, a vehicle destination, a vehicle destination route and a vehicle destination route condition.

20. The program of claim 16, further comprising:

computer program code to receive the mobile vehicle location coordinate from a wireless communication system connected between the mobile vehicle and the stationary site.

21. A method of searching for a feature of interest in proximity to a mobile vehicle, the method comprising:

receiving a vehicle proximity search request from a subscriber in the mobile vehicle, the vehicle proximity search request including a mobile vehicle location coordinate and a vehicle proximity parameter;

determining a vehicle proximity area for the mobile vehicle based on the received mobile vehicle location coordinate and the received vehicle proximity parameter;

searching a plurality of elements of interest contained in a database;

determining whether any elements of interest in the plurality of elements of interest are within the determined vehicle proximity area;

determining a distance from the received mobile vehicle location coordinate to each of the elements of interest within the determined vehicle proximity area; and transmitting a vehicle proximity search response to the subscriber based on the determined distance from the received mobile vehicle location coordinate to each of the elements within the determined vehicle proximity area, wherein the vehicle proximity search request is received by an advisor residing at a stationary site.

22. The method of claim 21 wherein the advisor comprises one of a human advisor and a virtual advisor.

* * * * *